(12) United States Patent
Lee et al.

(10) Patent No.: US 12,576,626 B2
(45) Date of Patent: Mar. 17, 2026

(54) LAMINATOR FOR MANUFACTURE OF UNIT STRUCTURAL BODIES WITH INCREASED FORCE OF ADHESION

(71) Applicant: LG Energy Solution, Ltd., Seoul (KR)

(72) Inventors: Byeong Kyu Lee, Daejeon (KR); Hyeok Jeong, Daejeon (KR); Soon Kwan Kwon, Daejeon (KR); Su Taek Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 726 days.

(21) Appl. No.: 17/914,166

(22) PCT Filed: Aug. 25, 2021

(86) PCT No.: PCT/KR2021/011362
§ 371 (c)(1),
(2) Date: Sep. 23, 2022

(87) PCT Pub. No.: WO2022/065709
PCT Pub. Date: Mar. 31, 2022

(65) Prior Publication Data
US 2023/0134414 A1 May 4, 2023

(30) Foreign Application Priority Data

Sep. 28, 2020 (KR) ......................... 10-2020-0125809

(51) Int. Cl.
*B32B 37/10* (2006.01)
*B32B 37/00* (2006.01)
(Continued)

(52) U.S. Cl.
CPC .......... *B32B 37/10* (2013.01); *B32B 37/0053* (2013.01); *B32B 37/06* (2013.01);
(Continued)

(58) Field of Classification Search
None
See application file for complete search history.

(56) References Cited

U.S. PATENT DOCUMENTS 2,293,568 A * 8/1942 Snyder ................... B32B 37/04
156/322
5,019,203 A 5/1991 Singer
(Continued)

FOREIGN PATENT DOCUMENTS

CN 103079509 A 5/2013
CN 103959539 A 7/2014
(Continued)

OTHER PUBLICATIONS

English machine translation of KR-20200067575-A to Kim; 12 pages; Jun. 12, 2020; H01M50/566. (Year: 2020).*
(Continued)

*Primary Examiner* — Linda L Gray
(74) *Attorney, Agent, or Firm* — Lerner David LLP

(57) ABSTRACT

A laminator is configured for increasing the force of adhesion between an electrode and a separator upon forming a unit structural body. The laminator is configured for heating a unit structural body sheet that includes an electrode and a separator in a stacked state and a press roll having a pair of upper and lower rolls configured to press the heated unit structural body sheet. The press roll is configured to raise its temperature. The average temperature of the press roll is higher than the temperature of the unit structural body sheet.

10 Claims, 5 Drawing Sheets

100

(51) Int. Cl.
    *B32B 37/06*     (2006.01)
    *B32B 38/00*     (2006.01)
    *H01M 10/04*     (2006.01)

(52) U.S. Cl.
    CPC ..... *B32B 38/0004* (2013.01); *H01M 10/0404*
    (2013.01); *B32B 2457/10* (2013.01)

(56) References Cited

U.S. PATENT DOCUMENTS

| | | | |
|---|---|---|---|
| 6,161,604 A * | 12/2000 | Richards | B41F 13/03 |
| | | | 156/509 |
| 8,216,415 B2 * | 7/2012 | Quinn | A61F 13/0283 |
| | | | 118/50 |
| 2010/0181027 A1 | 7/2010 | Bradley et al. | |
| 2013/0220541 A1 | 8/2013 | Fujiwara et al. | |
| 2014/0060723 A1 * | 3/2014 | Herle | H01M 10/052 |
| | | | 156/89.12 |
| 2014/0154565 A1 | 6/2014 | Ku et al. | |
| 2021/0098814 A1 | 4/2021 | Lee | |
| 2021/0098817 A1 | 4/2021 | Lee | |
| 2022/0006161 A1 | 1/2022 | Kim et al. | |

FOREIGN PATENT DOCUMENTS

| | | |
|---|---|---|
| CN | 208050577 U | 11/2018 |
| CN | 110212232 A | 9/2019 |
| JP | 2003297342 A | 10/2003 |
| JP | 2014120273 A | 6/2014 |
| JP | 2014127310 A | 7/2014 |
| JP | 2015041515 A | 3/2015 |
| JP | 2016139582 A | 8/2016 |
| KR | 20050032722 A | 4/2005 |
| KR | 20140081590 A | 7/2014 |
| KR | 20160050718 A | 5/2016 |
| KR | 20170063222 A | 6/2017 |
| KR | 102101831 B1 | 4/2020 |
| KR | 20200066901 A | 6/2020 |
| KR | 20200067575 A | 6/2020 |

OTHER PUBLICATIONS

Search Report dated Jan. 15, 2025 from the Office Action for Chinese Application No. 202180024131.1 Issued Jan. 17, 2025, pp. 1-3.

International Search Report for PCT/KR2021/011362 mailed Dec. 9, 2021. 4 pgs.

Yan, Xijie, "THERMOTICS", 1980, pp. 13-14 [retrieved on Jul. 16, 2025] 5 pgs.

Search Report dated Apr. 7, 2025 from the Office Action for Chinese Application No. 202180024131.1 Issued Apr. 10, 2025, pp. 1-2.

\* cited by examiner

LAMINATOR FOR MANUFACTURE OF UNIT STRUCTURAL BODIES WITH INCREASED FORCE OF ADHESION

CROSS-REFERENCE TO RELATED APPLICATIONS

The present application is a national phase entry under 35 U.S.C. § 371 of International Application No. PCT/KR2021/011362 filed on Aug. 25, 2021, and now published as International Publication No. WO 2022/065709 A1, which claims priority from Korean Patent Application No. 2020-0125809 filed on Sep. 28, 2020, all of which are hereby incorporated herein by reference in their entireties.

FIELD

The present invention relates to a laminator for manufacture of unit structural bodies including a means configured to raise the temperature of a press roll and an air blower configured to inject air to a middle part of the press roll in order to increase the force of adhesion between an electrode and a separator upon forming a unit structural body.

BACKGROUND

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium secondary battery, a nickel-cadmium battery, a nickel-hydride battery, and a nickel-zinc battery as secondary batteries that are widely used at present. In particular, research and development of the lithium secondary battery, which has high operating voltage and high energy density per unit weight, have been actively conducted.

Such a secondary battery includes an electrode assembly configured to have a structure in which electrodes and separators are alternately stacked and a case configured to receive the electrode assembly. The electrode assembly, which is a power generation element configured to have a structure in which a positive electrode and a negative electrode are stacked in the state in which a separator is interposed therebetween, is classified as a jelly-roll type electrode assembly, which is configured to have a structure in which a long sheet type positive electrode plate having an active material applied thereto and a long sheet type negative electrode plate having an active material applied thereto are wound in the state in which a separator is interposed therebetween, or a stacked type electrode assembly, which is configured to have a structure in which a plurality of positive electrode plates having a predetermined size and a plurality of negative electrode plates having a predetermined size are sequentially stacked in the state in which separators are interposed therebetween.

A stacked and folded type electrode assembly, which is configured to have a structure in which mono-cells each having a positive electrode/separator/negative electrode structure having a predetermined unit size or bicells each having a positive electrode (negative electrode)/separator/ negative electrode (positive electrode)/separator/positive electrode (negative electrode) structure are folded using a long continuous separation film, has been developed as an electrode assembly having an advanced structure, which is a combination of the jelly-roll type electrode assembly and the stacked type electrode assembly.

In addition, a laminated and stacked type electrode assembly, which is configured to have a structure in which unit structural bodies, in each of which electrodes and separators are laminated with each other in a state of being alternately stacked, are stacked, has also been developed in order to improve processability of a conventional stacked type electrode assembly and to satisfy demand for various kinds of secondary batteries.

An apparatus for manufacturing such a unit structural body is shown in FIGS. 1 and 2.

FIG. 1 is a perspective view schematically showing a conventional unit structural body manufacturing apparatus, and FIG. 2 is a plan view schematically showing a portion of a conventional laminator for manufacture of unit structural bodies.

When describing the conventional unit structural body manufacturing apparatus with reference to FIGS. 1 and 2, the conventional unit structural body manufacturing apparatus includes separator winding rolls 21 and 22 having separators wound therearound, electrode winding rolls 11 and 12 having electrodes wound therearound, cutters 31 and 32 configured to cut the electrodes into a predetermined size and to locate the cut electrodes on the separators, laminators $L_1$ and $L_2$ configured to apply heat and pressure to a unit structural body sheet constituted by the electrodes and the separators that are stacked to adhere the electrodes and the separators to each other, and a cutter 33 configured to cut the adhered unit structural body sheet to form a unit structural body 1.

Here, the laminators $L_1$ and $L_2$ are configured to adhere the electrodes and the separators that are stacked to each other. As shown in FIG. 2, each laminator includes a press roll R and a heating means (not shown) configured to heat the unit structural body sheet before the unit structural body sheet reaches the press roll R.

In the conventional laminators $L_1$ and $L_2$, however, the average temperature $T_2$ of the press roll R is lower than the temperature $T_1$ of the heated unit structural body sheet, and the unit structural body sheet, the temperature of which is relatively high, and the press roll R are continuously in contact with each other, whereby the temperature of the press roll R becomes higher than an initially set temperature.

In particular, when the temperature of a middle part $R_2$ of the press roll R becomes higher than the temperature of a peripheral part $R_1$ of the press roll R, there occurs a difference in thermal expansion between the middle part $R_2$ and the peripheral part $R_1$ of the press roll R, which is generally a rigid roll made of a metal material.

That is, the middle part $R_2$, the temperature of which is relatively high, expands much more, whereby much more pressure is applied to a middle part of the unit structural body sheet when being pressed, and therefore the middle part of the unit structural body sheet has sufficient force of adhesion, whereas sufficient force of adhesion is not provided at a peripheral part of the unit structural body sheet.

Meanwhile, if the force of adhesion of the unit structural body sheet at the peripheral part thereof is not sufficient, there is a high possibility of separation between the electrodes and the separators in a unit structural body transfer process or subsequent processes.

In order to solve this problem, therefore, it is necessary to perform the pressing operation with pressure higher than necessary or to increase the force of adhesion through an additional process.

SUMMARY OF THE DISCLOSURE

The present invention has been made in view of the above problems, and it is an object of the present invention to provide a laminator for manufacture of unit structural bodies including a means configured to raise the temperature of a press roll and an air blower configured to inject air to a middle part of the press roll in order to manufacture a unit structural body with increased force of adhesion at a peripheral part thereof.

In order to accomplish the above object, a laminator for manufacture of unit structural bodies according to the present invention includes a heating means configured to heat a unit structural body sheet constituted by an electrode and a separator in a stacked state and a press roll constituted by a pair of upper and lower rolls configured to press the heated unit structural body sheet, wherein the press roll is provided therein with a temperature raising means configured to raise the temperature of the press roll, and the average temperature of the press roll is higher than the temperature of the unit structural body sheet.

Also, the laminator for manufacture of unit structural bodies according to the present invention may further include an air blower configured to inject air having a temperature lower than the average temperature of the press roll to the press roll.

Also, in the laminator for manufacture of unit structural bodies according to the present invention, the air blower may inject air to a middle part of the press roll such that the temperature of the middle part of the press roll is lower than the temperature of a peripheral part of the press roll.

Also, in the laminator for manufacture of unit structural bodies according to the present invention, the air blower may be individually provided at each of the upper and lower rolls of the press roll.

Also, in the laminator for manufacture of unit structural bodies according to the present invention, the air blower may continuously inject air to the middle part of the press roll.

Also, in the laminator for manufacture of unit structural bodies according to the present invention, the length of the press roll in an axial direction may be greater than the width of the unit structural body sheet.

Also, in the laminator for manufacture of unit structural bodies according to the present invention, the press roll may be a rigid roll made of a metal material.

Also, the laminator for manufacture of unit structural bodies according to the present invention may further include a temperature sensor configured to measure the temperature of the middle part of the press roll and the temperature of the peripheral part of the press roll.

In addition, a unit structural body manufacturing method according to the present invention includes stacking a separator and an electrode cut to a predetermined size to form a unit structural body sheet, heating the unit structural body sheet, pressing the heated unit structural body sheet using a press roll to adhere the electrode and the separator to each other, and cutting the unit structural body sheet with the electrode and the separator adhered to each other, wherein, in the adhesion step, the temperature of a middle part of the press roll is lower than the temperature of a peripheral part of the press roll.

Also, in the unit structural body manufacturing method according to the present invention, the average temperature of the press roll may be higher than the temperature of the unit structural body sheet.

In addition, a battery cell according to the present invention includes a unit structural body manufactured using the unit structural body manufacturing method according to the present invention.

In addition, a battery pack according to the present invention includes the battery cell according to the present invention.

A laminator for manufacture of unit structural bodies according to the present invention has an advantage in that the temperature of a peripheral part of a press roll is higher than the temperature of a middle part of the press roll, whereby it is possible to increase the force of adhesion of a unit structural body sheet at a peripheral part thereof.

In addition, the laminator for manufacture of unit structural bodies according to the present invention has an advantage in that the laminator includes an air blower, whereby it is possible to prevent a change in temperature due to contact between the press roll and a unit structural body such that the peripheral part of the press roll is constantly maintained at a temperature uniformly higher than the temperature of the middle part of the press roll.

In addition, the laminator for manufacture of unit structural bodies according to the present invention has an advantage in that the force of adhesion of the unit structural body sheet at the peripheral part thereof is increased, whereby it is possible to manufacture a unit structural body with desired force of adhesion without additional processes.

DETAILED DESCRIPTION

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but rather means that such elements may be further included unless mentioned otherwise.

Hereinafter, a laminator for manufacture of unit structural bodies according to the present invention will be described with reference to the accompanying drawings.

Figure 1:
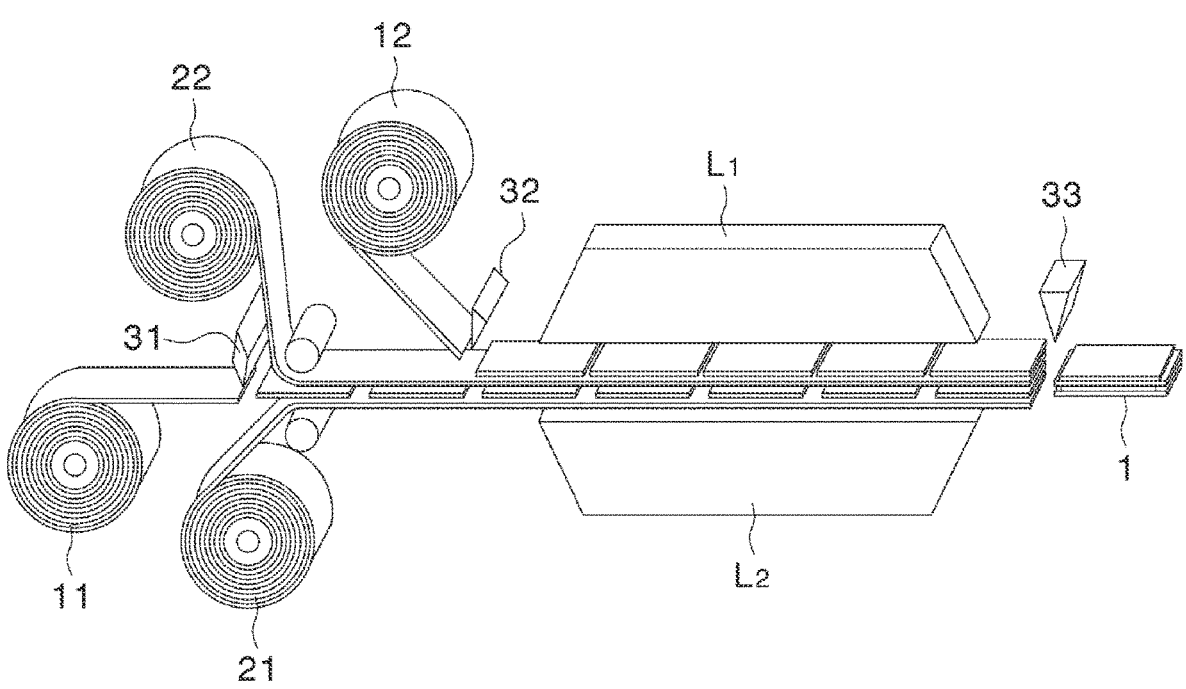
FIG. 1 is a perspective view schematically showing a conventional unit structural body manufacturing apparatus.
Figure 2:
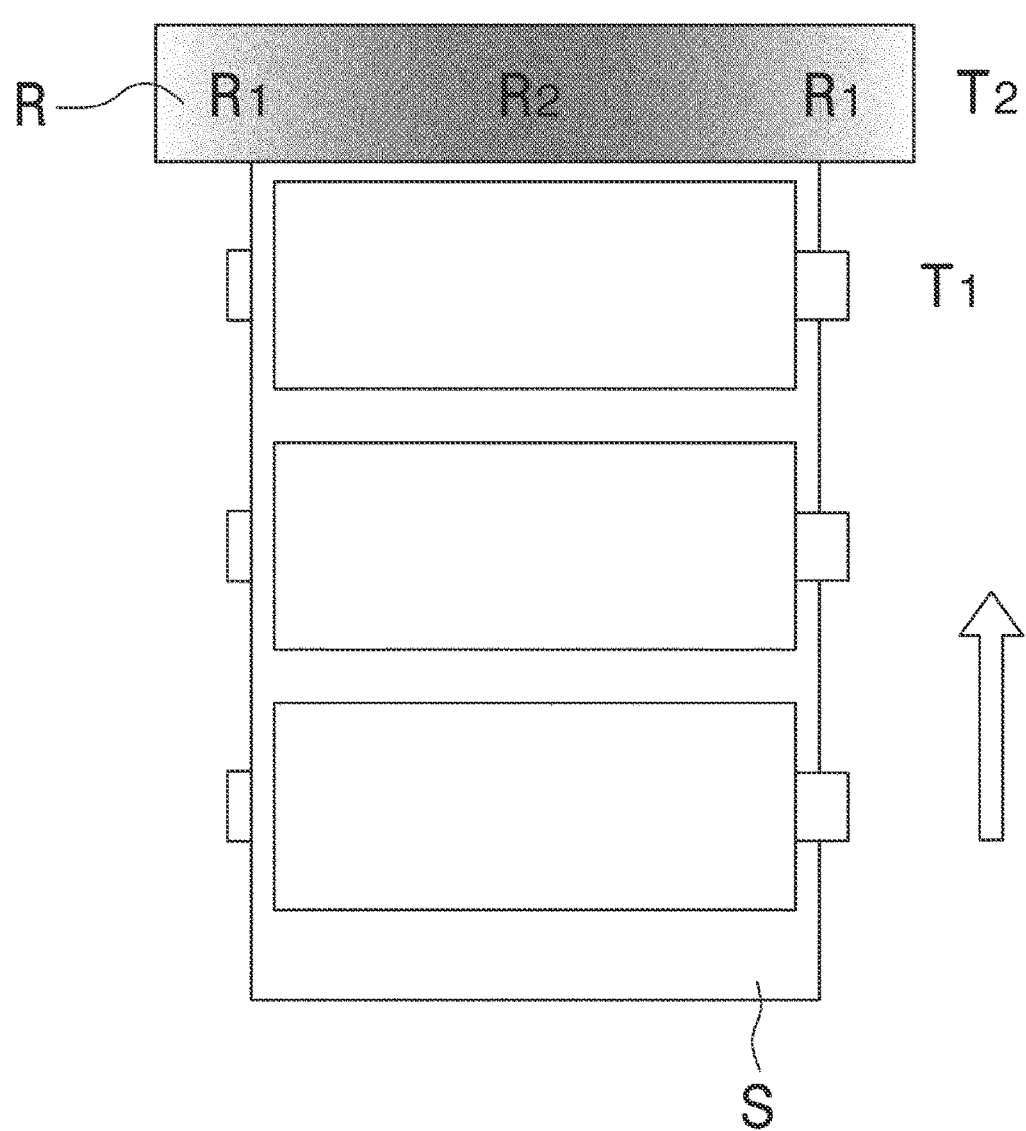
FIG. 2 is a plan view schematically showing a portion of a conventional laminator for manufacture of unit structural bodies.
Figure 3:
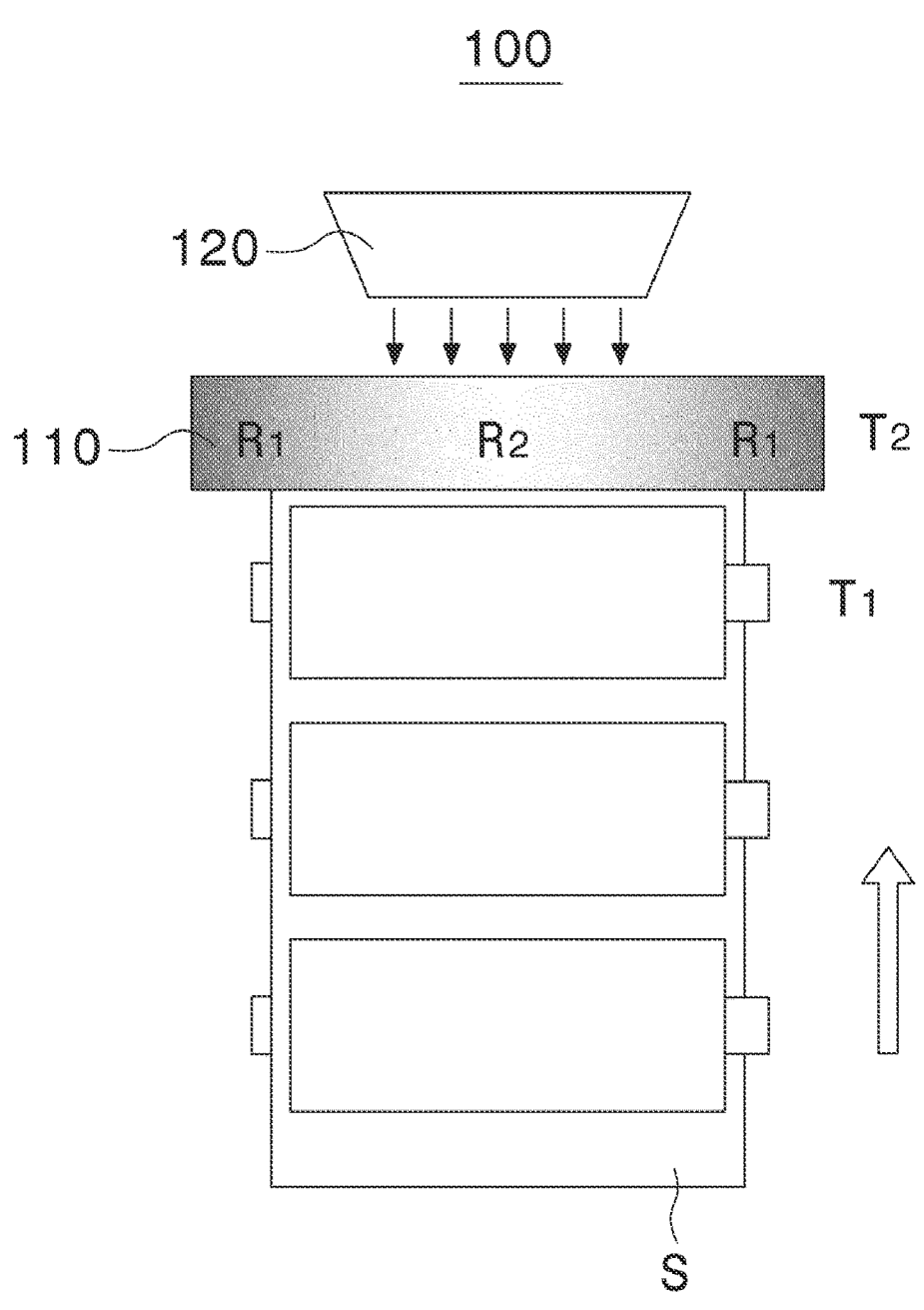
FIG. 3 is a plan view schematically showing a portion of a laminator and structural body sheet during the manufacture of unit structural bodies according to an embodiment.
Figure 4:
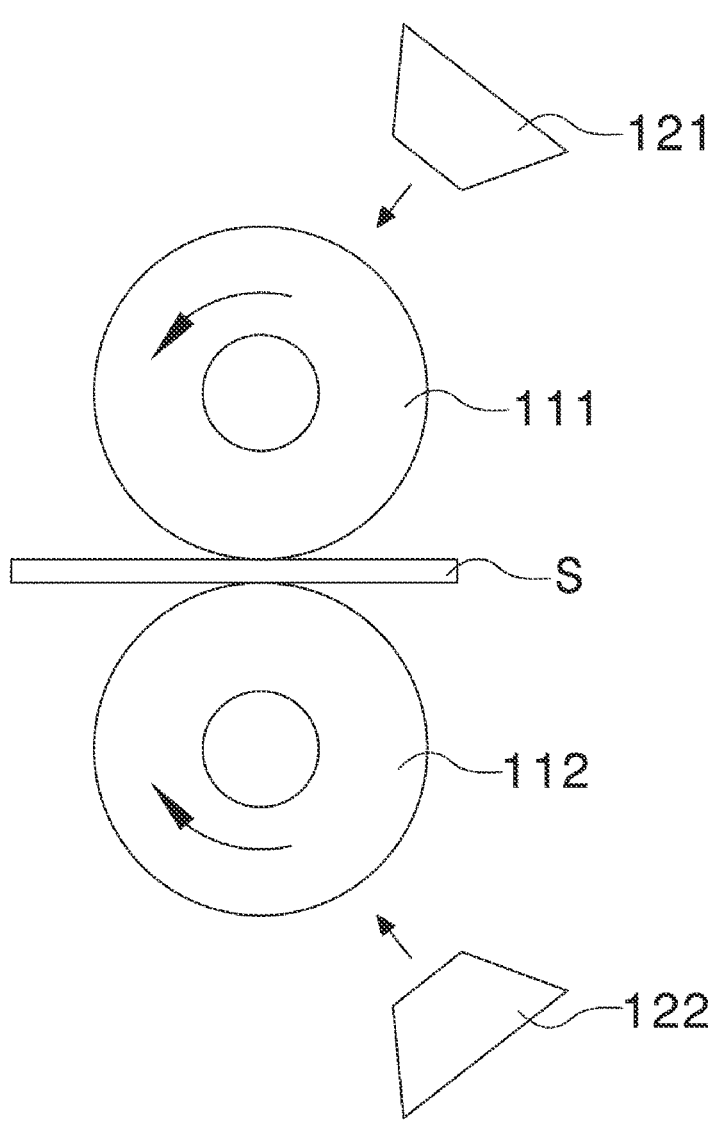
FIG. 4 is a front view schematically showing a portion of the laminator and structural body sheet of FIG. 3 during the manufacture of unit structural bodies according to the embodiment.

FIG. 3 is a plan view schematically showing a portion of a laminator for manufacture of unit structural bodies according to an embodiment, and FIG. 4 is a front view schematically showing a portion of the laminator for manufacture of unit structural bodies according to the embodiment.

When describing the laminator 100 in detail with reference to FIGS. 3 and 4, the laminator 100 includes a heating means (not shown) configured to raise the temperature of a unit structural body sheet S, a press roll 110 configured to press the unit structural body sheet S, and an air blower 120.

First, the heating means is configured to raise the temperature of the unit structural body sheet before the unit structural body sheet is pressed by the press roll 110 in order to increase the force of adhesion between an electrode and a separator. A heating method is not particularly restricted. Any of known indirect heating methods based on radiation and convection may be selected and used.

In addition, it is preferable for heating temperature of the unit structural body sheet S to be between 60° C. and 105° C. If the heating temperature is lower than 60° C., it is difficult to secure the force of adhesion between the electrode and the separator. If the heating temperature is higher than 105° C., on the other hand, defects, such as performance deterioration, may occur due to shrinkage of the separator.

Next, the press roll 110, which is constituted by a pair of an upper press roll 111 and a lower press roll 112, presses the unit structural body sheet S passing between the upper press roll and the lower press roll while rotating such that the electrode and the separator are adhered to each other.

Consequently, the press roll 110 is formed such that the length of the press roll in an axial direction is greater than the width of the unit structural body sheet S that passes between the constituents of the press roll 110.

A temperature raising means (not shown) configured to raise the average temperature $T_2$ of the press roll 110 is provided in the press roll 110. The temperature raising means heat the press roll 110 such that the average temperature $T_2$ of the press roll 110 is higher than the temperature $T_1$ of the unit structural body sheet S.

The temperature raising means is not particularly restricted as long as the temperature raising means is located in the press roll 110 so as to heat the press roll 110, and any of various known devices may be used.

Meanwhile, a rigid roll made of any of various metal materials is used as the press roll 110. The length of a metal is changed depending on a change in temperature thereof, i.e. the metal thermally expands, and each metal has an inherent coefficient of thermal expansion.

The coefficient of thermal expansion is typically classified into a coefficient of linear thermal expansion and a coefficient of volume thermal expansion. In the present disclosure, the "coefficient of thermal expansion" means the "coefficient of linear thermal expansion," unless mentioned otherwise.

For example, stainless steel has a coefficient of thermal expansion of about 9 to 18 [$10^{-6}$/° C.] within a range of 0 to 100° C. depending on the kind thereof.

Specifically, ferrite-based stainless steel has a coefficient of thermal expansion of about 9.3 to 12 [$10^{-6}$/° C.], martensite-based stainless steel has a coefficient of thermal expansion of about 9.9 to 12 [$10^{-6}$/° C.], and austenite-based stainless steel has a coefficient of thermal expansion of about 9.8 to 25 [$10^{-6}$/° C.].

In the case in which the press roll 110 is made of a metal, such as stainless steel, therefore, a temperature gradient may occur in the press roll 110 depending on the position thereof, whereby a difference in thermal expansion may occur.

Also, in the laminator 100, the air blower 120, which is configured to inject air to the press roll 110, is further provided.

The air blower 120 is constituted by an upper air blower 121 corresponding to the upper press roll 111 and a lower air blower 122 corresponding to the lower press roll 112.

The air blower 120 injects air having a temperature lower than the average temperature $T_2$ of the press roll 110 to a middle part $R_2$ of the press roll 110 heated to a temperature higher than the temperature of the unit structural body sheet S by the temperature raising means such that the temperature of the middle part $R_2$ of the press roll 110 is lower than the temperature of a peripheral part $R_1$ of the press roll.

As a result, the peripheral part $R_1$ of the press roll 110, which has a temperature higher than the temperature of the middle part $R_2$ of the press roll 110, thermally expands much more than the middle part of the press roll, and much more pressure is applied to a peripheral part of the unit structural body sheet S by the peripheral part $R_1$ having a diameter increased much more than the diameter of the middle part due to a difference in thermal expansion.

Consequently, the peripheral part of the unit structural body sheet S has force of adhesion higher than the force of adhesion at the remaining part of the unit structural body sheet, whereby it is possible to prevent poor adhesion at the peripheral part of the unit structural body sheet.

In addition, since the laminator 100 includes the air blower 120, as described above, the middle part $R_2$ of the press roll 110 is constantly maintained at a temperature uniformly lower than the temperature of the peripheral part $R_1$ of the press roll 110 without influences due to contact with the unit structural body sheet S from a start step of the process, whereby it is possible to press the unit structural body sheet S with a uniform pressure while the process is performed.

Meanwhile, the conditions of air injected by the air blower 120, such as the temperature, speed, and amount thereof, appropriately selected within a range within which the temperature of the middle part $R_2$ of the press roll 110 approximates the temperature $T_1$ of the unit structural body sheet S, although the conditions of the air are not particularly restricted.

A unit structural body with increased force of adhesion at a peripheral part thereof may be manufactured using the laminator 100 for manufacture of unit structural bodies.

When describing a method of manufacturing the unit structural body, first, a separator and an electrode cut to a predetermined size are stacked to form a unit structural body sheet, and the formed unit structural body sheet is introduced into the laminator and is heated using the heating means.

Subsequently, the unit structural body sheet is pressed using the press roll in the state in which the temperature of the peripheral part of the press roll is higher than the temperature of the middle part of the press roll to adhere the electrode and the separator to each other.

At this time, the average temperature of the press roll is higher than the temperature of the heated unit structural body sheet.

Finally, one electrode adhered to the separator and another electrode adhered to the separator are separated from each other by cutting to form a unit structural body with increased force of adhesion between the electrode and the separator at a peripheral part thereof.

As a result, it is possible to prevent defects that may occur due to separation between the electrode and the separator in a unit structural body transfer process or subsequent processes of manufacturing a battery cell using the unit structural body.

Unit structural bodies may be stacked to form an electrode assembly, the formed electrode assembly may be received in a case, and an electrolytic solution may be injected into the case to form a battery cell.

In addition, a plurality of battery cells may be connected to each other in series or in parallel, and various kinds of components may be added to manufacture a battery module or a battery pack. The manufactured battery module or battery pack is used as a power supply source for various kinds of devices.

Figure 5A:
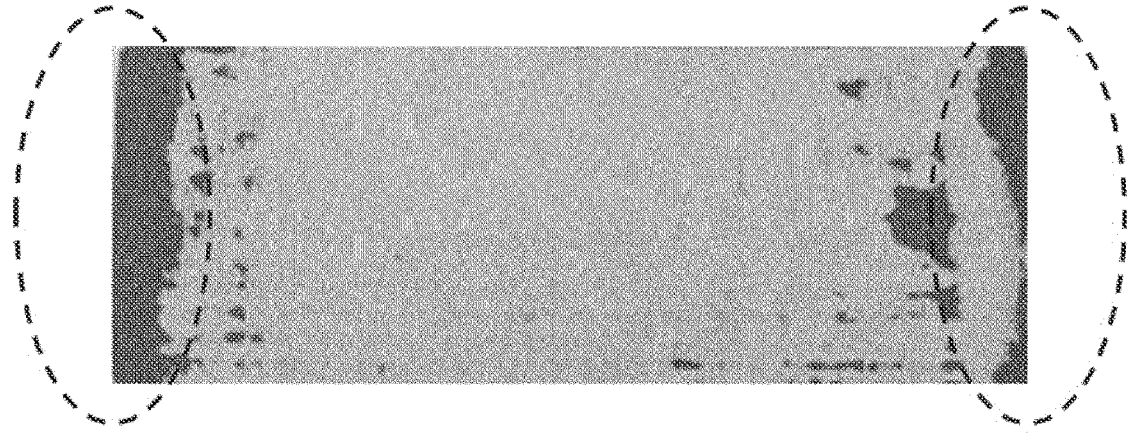
FIGS. 5A and 5B are views showing a difference in position-based force of adhesion between (a) a unit structural body manufactured using the laminator for manufacture of unit structural bodies according to the embodiment and (b) a unit structural body manufactured using the conventional laminator for manufacture of unit structural bodies, respectively.
Figure 5B:
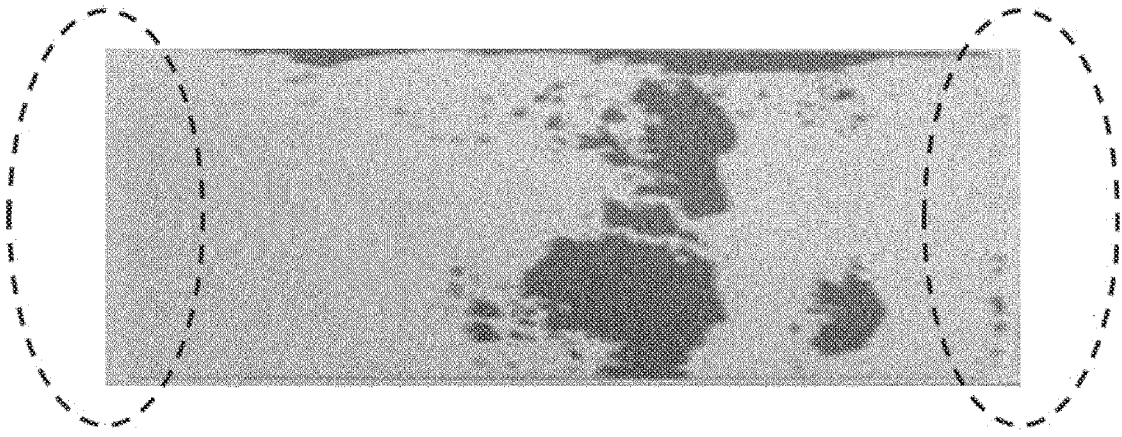

FIGS. 5A and 5B are views showing a difference in position-based force of adhesion between (a) a unit structural body manufactured using the laminator for manufacture of unit structural bodies according to the embodiment of the embodiment and (b) a unit structural body manufactured using the conventional laminator for manufacture of unit structural bodies, respectively.

In FIGS. 5A and 5B, a darker portion indicates that the force of adhesion between the electrode and the separator is higher, and a brighter portion indicates that the force of adhesion between the electrode and the separator is lower.

In addition, the force of adhesion means the value of peel strength measured using an adhesive force measuring instrument at normal temperature.

When describing a difference in force of adhesion between the unit structural body according to the present disclosure and the conventional unit structural body with reference to FIGS. 5A and 5B, the force of adhesion of the unit structural body according to the present disclosure at the peripheral part thereof is high due to the press roll having great thermal expansion at the peripheral part thereof, as clearly shown in FIG. 5A, whereas the middle part of the unit structural body is pressed with higher pressure, whereby the force of adhesion of the unit structural body at the middle part thereof is high, as shown in FIG. 5B.

As can be seen therefrom, there is a definite difference in position-based force of adhesion between the unit structural body manufactured using the laminator 100 for manufacture of unit structural bodies and the unit structural body manufactured using the conventional laminator.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

100: Laminator
110: Press roll

111: Upper press roll
112: Lower press roll
120: Air blower
121: Upper air blower
122: Lower air blower
S: Unit structural body sheet
$R_1$: Peripheral part of press roll
$R_2$: Middle part of press roll
$T_1$: Temperature of unit structural body sheet
$T_2$: Average temperature of press roll

The invention claimed is:

1. A laminator for manufacturing unit structural bodies, the laminator comprising:
    a heating means configured to heat a unit structural body sheet that includes an electrode and a separator in a stacked state and configured to form a heated unit structural body sheet; and
    a press roll comprising a pair of upper and lower rolls and configured to press the heated unit structural body sheet; and
    an air blower configured to inject air onto the press roll, the air having a temperature lower than a temperature of the press roll,
    wherein the press roll includes a temperature raising means configured to raise the temperature of the press roll, and
    wherein an average temperature of the press roll, during a manufacture of the unit structural bodies, is higher than a temperature of the unit structural body sheet during the manufacture of the unit structural bodies.

2. The laminator according to claim 1, wherein the air blower injects air to a middle part of the press roll such that a temperature of the middle part of the press roll is lower than a temperature of a peripheral part of the press roll.

3. The laminator according to claim 1, further comprising a further air blower, wherein the air blowers are disposed to inject air onto respective ones of the upper and the lower rolls of the press roll.

4. The laminator according to claim 2, wherein the air blower continuously injects air to the middle part of the press roll.

5. The laminator according to claim 1, wherein a length of each of the upper and the lower rolls in an axial direction is greater than a width of the unit structural body sheet.

6. The laminator according to claim 1, wherein each the upper and the lower rolls is rigid and made of metal.

7. The laminator according to claim 2, further comprising a temperature sensor configured to measure the temperature of the middle part of the press roll and the temperature of the peripheral part of the press roll.

8. A method for manufacturing a unit structural body with increased force of adhesion between an electrode and a separator, the method comprising:
    stacking a separator and an electrode cut to a predetermined size to form a unit structural body sheet;
    heating the unit structural body sheet to form a heated unit structural body sheet;
    pressing the heated unit structural body sheet using a press roll to adhere the electrode and the separator to each other;
    injecting air onto the press roll from an air blower, the air having a temperature lower than the temperature of the press roll; and
    cutting the unit structural body sheet with the electrode and the separator adhered to each other, wherein during the pressing of the unit structural body sheet, a temperature of a middle part of the press roll is lower than a temperature of a peripheral part of the press roll.

9. The method according to claim 8, wherein an average temperature of the press roll is higher than a temperature of the unit structural body sheet.

10. A battery cell comprising a unit structural body manufactured using a method according comprising:

stacking a separator and an electrode cut to a predetermined size to form a unit structural body sheet;

heating the unit structural body sheet to form a heated unit structural body sheet;

pressing the heated unit structural body sheet using a press roll to adhere the electrode and the separator to each other;

injecting air onto the press roll from an air blower, the air having a temperature lower than the temperature of the press roll; and cutting the unit structural body sheet with the electrode and the separator adhered to each other to form the unit structural body, wherein during the pressing of the unit structural body sheet, a temperature of a middle part of the press roll is lower than a temperature of a peripheral part of the press roll.

* * * * *